United States Patent [19]

Pavelescu et al.

[11] Patent Number: 5,779,834
[45] Date of Patent: Jul. 14, 1998

[54] PROCESS OF MAKING A SHOE WITH A SPRAY-MOLDED SOLE AND SHOE MANUFACTURED THEREFROM

[75] Inventors: Liviu Mihai Pavelescu, Dortmund; Manfred Haderlein, Haan, both of Germany

[73] Assignee: Akzo Nobel NV, Arnhem, Netherlands

[21] Appl. No.: 708,606

[22] Filed: Sep. 5, 1996

[51] Int. Cl.⁶ ............................... A43B 9/16; A43B 13/28
[52] U.S. Cl. .................. 156/93; 12/142 RS; 36/12; 36/14; 264/244
[58] Field of Search ............. 156/93, 245; 264/244, 264/257; 36/12, 14, 19.5; 12/142 R, 146 B, 146 BR, 142 RS, 142 T

[56] References Cited

U.S. PATENT DOCUMENTS

| | | | |
|---|---|---|---|
| 3,441,643 | 4/1969 | Tusa | 264/244 |
| 3,510,968 | 5/1970 | Hobbs | 12/142 R |
| 3,983,204 | 9/1976 | Opinsky | 264/244 |
| 4,120,477 | 10/1978 | Justamente | 264/244 |
| 4,434,518 | 3/1984 | Watanabe | 264/244 |
| 4,562,606 | 1/1986 | Folschweiler | 12/142 RS |
| 4,858,342 | 8/1989 | Nicholson | 12/142 R |
| 4,899,465 | 2/1990 | Bleimhofer et al. | 36/12 |
| 5,106,445 | 4/1992 | Fukuoka | 156/245 |
| 5,433,021 | 7/1995 | Mahler | 36/12 |

FOREIGN PATENT DOCUMENTS

| | | |
|---|---|---|
| 3821602 | 3/1989 | Germany. |
| 0594029 | 4/1994 | Germany. |
| 4334971 | 4/1995 | Germany. |
| 4419802 | 12/1995 | Germany. |

*Primary Examiner*—Daniel Stemmer
*Attorney, Agent, or Firm*—Oliff & Berridge, PLC

[57] ABSTRACT

A process of making a shoe includes bonding a flat structure to an upper layer of the shoe to form a bonded structure. The flat structure has a melting temperature $T_2$ and provides stability to a shape of the upper layer. The bonded structure is positioned into a mold so that an underside of the bonded structure faces the mold. A liquid sole material at a temperature $T_1$ which is greater than $T_2$ is sprayed into the mold, thereby contacting and melting the flat structure. The sole material cools and solidifies to form a shoe. The flat structure has a melting temperature $T_2$ and provides stability to a shape of the upper layer.

19 Claims, 3 Drawing Sheets

5,779,834

1

PROCESS OF MAKING A SHOE WITH A SPRAY-MOLDED SOLE AND SHOE MANUFACTURED THEREFROM

BACKGROUND OF THE INVENTION

The present invention relates to a process of making a shoe which comprises an upper layer and a sole, spray-molded onto the upper layer, wherein at least a part of the upper layer facing the sole is bonded to a flat structure to form a bonded structure and at the same time maintain a desired shape of the upper layer. A material for making the spray-molded sole is heated to a temperature, $T_1$, in order to liquify the material, and subsequently spray-molded to form a sole and allowed to cooled. The present invention also relates to shoes manufactured according to the above method.

Similar manufacturing methods are known in the prior art. For example, EP-A-0 594 029, DE-A-43 34 971, DE-A-44 19 802 and DE-A-38 21 602 teach methods of making shoes. In these methods, an insole is employed to maintain the shape of a portion of the upper material facing the sole, the insole being bonded to the upper material. In spray-molded shoes, the insole material must match the material of the sole so that the sole material adheres securely and tightly to the insole after being sprayed. The result is that the insole no longer has to fulfill its original role of shaping the upper material once the sole material has been spray-molded onto the insole.

Nevertheless, the majority of shoes with spray-molded soles are still provided with an insole today. Since the insole is relatively thick, as well as stiff, bonding the insole with the upper material, which is usually accomplished by sewing, is very expensive. Large forces are necessary for piercing the insole with the sewing needle.

SUMMARY OF THE INVENTION

Thus, an objective of the present invention is to simplify manufacturing methods of the prior art mentioned above, and to provide shoes which are simple to manufacture.

This objective is accomplished by a method of manufacture comprising the steps of selecting a flat structure which has a melting temperature $T_2$, which is lower than $T_1$, bonding the flat structure to an upper material to form a bonded structure, and spray-molding the bonded structure with sole material heated to temperature $T_1$ such that the flat structure bonded to the upper material melts.

In some cases, it is sufficient that a narrow strip is selected for the flat structure which keeps the upper material in shape in a critical region, the shank area. However, the flat structure can also cover larger areas of the foot side of the shoe upper, for example, the area between the shank area and the toe or the shank area up to the heel. However, it is also possible to cover the entire sole area with the flat structure, so that a bond with the upper material is effected along the outer edge of the flat structure.

According to the present invention, the flat structure used in the manufacture of the shoe loses the consistency it possessed before the sole was spray-molded, and in the finished shoe, the flat structure is either embedded in the material of the sole in a finely dispersed form or it forms an adhesive layer on the inside face of the sole, onto which an insole can, for instance, be bonded. Consequently, the flat structure can be made much thinner than traditional insoles which means that a shoe manufactured according to the present invention is much lighter than a traditional shoe. This greatly improves the wearing comfort of the shoe.

2

The support between the sole and the upper material is accomplished by bonding which takes place when the sole material is spray-molded onto the bonded structure. This support is sufficient even when the shoe manufactured in accordance with the method of the present invention is subjected to extreme strain. Since the sole material securely envelopes the lower edge of the upper material, this bond is also waterproof.

As long as the flat structure is liquified very rapidly when the hot sole spray-molding material contacts it, it has proved advantageous to maintain the upper layer in a desired shape by outward means during spray-molding of the sole. This can be performed, for example, by giving a suitable shape to the spray-mold used for spray-molding the sole. One preferred spray-mold comprises a mold which is shaped such that the liquid sole material first contacts the upper layer along an outer perimeter of the upper layer so that the sole material itself maintains the upper material in a desired shape until the remaining sole material hardens. Here, the liquid sole material fills out the space between the upper material and the walls of the spray-mold and keeps the upper material in a desired shape due to the pressure used during spray-molding. The upper material is prevented from shifting inwards by means of a last used during spray-molding.

One preferred embodiment of the manufacturing method of the present invention comprises the method above wherein a porous flat structure, which can be penetrated by the sole material, is selected for the flat structure. A porous flat structure provides quicker penetration of the hot, liquid sole material into the flat structure, resulting in particularly rapid melting of the flat structure. In this embodiment, the flat structure completely melts before the sole material begins to cool. In order to prevent the sole material from bonding to the last, which is in the shoe during spray-molding, a separating agent is applied to the last prior to spray-molding. A further preferred embodiment comprises the method above wherein an insole is inserted between the last and the flat structure. By suitably shaping the side of the last facing the insole, the side of the spray-molded sole facing the last is simply designed to produce a very comfortable footbed in a simple fashion, unlike traditional methods which insert the insole into the shoe later.

One preferred embodiment of the method of the present invention comprises using a porous flat structure, which has openings penetrating through the flat structure. It is especially advantageous if the openings are evenly distributed in the flat structure. This preferred method is extremely beneficial when the flat structure comprises a thermoplastic material.

Preferred flat structures for use in the present invention comprise a net or a textile flat structure such as a woven fabric, a knitted fabric, a nonwoven fabric or other flat structures containing fibers or yarns. These flat structures possess the strength required for shaping the upper layer even in relatively thin form.

As in traditional methods utilizing an insole, the method of the present invention preferably bonds the flat structure to the upper layer by sewing. However, sewing in the present invention is performed at much less expense than traditional methods, since the flat structure selected for the present invention is much thinner than the insole commonly used and can therefore be pierced more easily with the sewing needle.

Preferably, sewing the flat structure to the upper layer is accomplished using a sewing thread having a melting temperature $T_3$ which is lower than the temperature $T_1$ of the liquid sole material. When the sole material is spray-molded onto the bonded structure, not only does the flat structure lose its consistency, but preferably the sewing thread does as well. In such a case, enhanced bonding of the sole material to the upper material results, which is especially useful for shoes which are subject to a high level of strain in use.

Preferably, the melting temperature $T_3$ of the sewing thread is at least 5° C. lower than the temperature $T_1$ of the sole material. In a most preferred embodiment, the melting temperature $T_3$ of the sewing thread is 10° to 25° C. lower than the temperature $T_1$ of the sole material.

Preferably, the melting temperature $T_2$ of the flat structure is at least 5° C., more preferably, 8° to 25° C. lower than the temperature $T_1$ of the sole material.

Preferred flat structure and sewing thread materials include polyethylene, polypropylene, polyester, and polyamide.

A preferred sole material is polyurethane, which is liquid at temperatures in the range of 140° to 150° C., and possesses the consistency and suitable viscosity required for spray-molding. Such polyurethanes are known to those of ordinary skill in the art.

If a polyurethane heated to 140° to 150° C. is employed for spray-molding the sole, preferably a material for the flat structure is selected having a melting point or range of melting points from 120° and 140° C. as long as the melting temperature of the flat structure is below the temperature of the polyurethane. Polyethylenes and polypropylenes having a melting temperature in the range above have proved most beneficial for the flat structure.

The method of the present invention is particularly suitable for manufacturing a shoe wherein the lining contains a waterproof, water vapor-permeable functional layer. Due to the water vapor-permeability of the functional layer, which is available on the market under the brand name SYMPATEX™, for example, a high level of comfort is obtained, since the water vapor-permeability of the shoe greatly reduces moisture build-up around the wearer's feet, and provides protection from wetness from outside of the shoe.

Consequently, a preferred method of the present invention comprises arranging a lining containing a waterproof, water vapor-permeable functional layer on at least a portion of an inner surface of the upper material such that a portion of the lining with the functional layer extends inward from an outer periphery of the upper layer in the direction of the sole prior to bonding the flat structure to the upper layer. In this embodiment, the sole material is spray-molded onto the flat structure and the portion of the lining extending inward from the outer periphery of the upper layer. The lining with the functional layer is bonded to at least the melted flat structure, and possibly to the sole material. Penetration by water is effectively prevented by bonding the sole to the upper layer and to the functional layer.

In a preferred embodiment, the flat structure is porous so that it can be penetrated by the sole material. In this embodiment, the sole material penetrates and melts the flat structure, and forms a continuous surface with a portion of the lining extending inward from an outer periphery of the upper layer of the shoe. The resulting footbed is uniform, without edges and projections, and provides a very comfortable shoe.

A further preferred embodiment of the present invention comprises adhesively attaching a portion of the lining which extends inward from an outer periphery of the upper layer to the flat structure prior to spraying the sole material. Adhesively attaching the lining to the flat structure enables the formation of a bonded structure free of folds and fixed in a position before the spraying step. The resulting footbed exhibits a smooth form, not only in the region of the sole, but also in the region of the lining. In some cases, it is sufficient to adhesively attach the lining to the flat structure in a few places. However, it may be necessary to adhesively attach the lining to the flat structure over the entire contact surface in special cases.

A further objective of the present invention is to provide a shoe manufactured in accordance with the method of the present invention. Such a shoe is lightweight and possesses high wearing comfort. The shoe of the present invention which contains a waterproof, water vapor-permeable functional layer in the lining provides exceptionally high reliability in regard to waterproof properties, breathability and high ability to withstand stress.

BRIEF DESCRIPTION OF THE DRAWINGS

The present invention is described in more detail with reference to the following drawings wherein like reference numerals refer to like elements and wherein.

DESCRIPTION OF PREFERRED EMBODIMENTS

Figure 1:
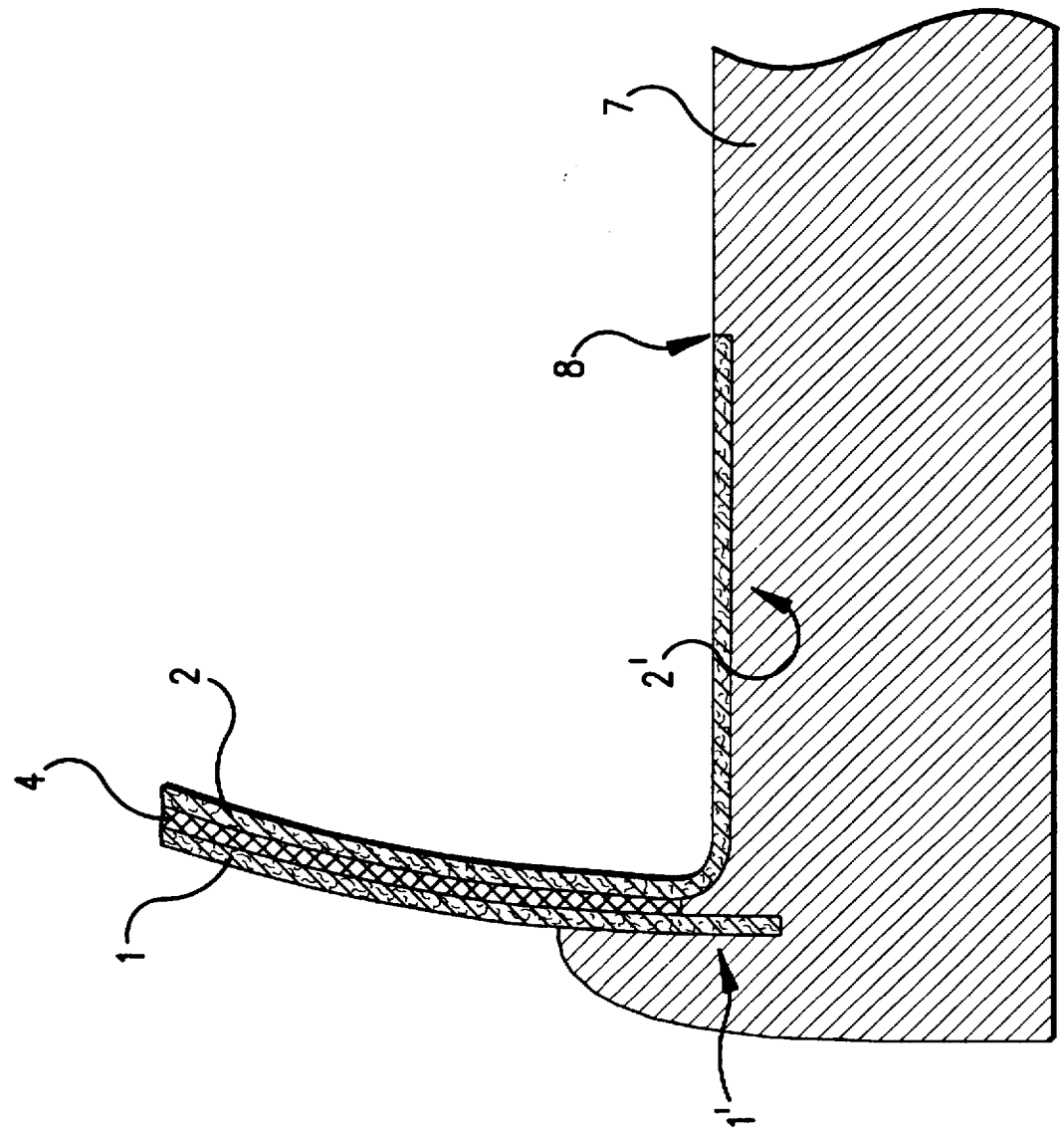
FIG. 1 shows a partial cross-sectional view of a shoe manufactured in accordance with a preferred embodiment of the method of the present invention with a spray-molded sole and a lining including a functional layer.

In FIG. 1, a shoe of one preferred embodiment is displayed in partial cross-section. The shoe comprises a wool lining 2 which includes a waterproof, water vapor-permeable functional layer, an upper material 1 and a spray-molded sole 7. A preferred functional layer is in the form of a membrane of copolyether ester with a large number of recurring intralinear long-chain and short-chain ester units, which are linked statistically head to tail through ester bonds, known as SYMPATEX™. Preferably, the lining with the functional layer 2 is bonded to upper material 1 with an adhesive 4, which is most preferably a water vapor-permeable adhesive. The lining with its functional layer is longer than the upper material and is turned back inwards in such a way that the turned-back part of the lining 2 is at least approximately parallel to the surface extension of the sole. The sole material forms an even surface towards the inside of the shoe and is notched in area 8, so that the turned-back part of the lining forms a continuous surface with the inside of the outsole. Consequently, in area 8, there is no edge or visible gap between the turned-back part of the lining and the inside surface of the sole. The upper material 1 has an end 1' pointing towards the sole which is completely embedded in the sole material.

Since the flat structure employed to maintain the sole shape melts and is generally embedded in the material of the sole in a finely dispersed form, i.e., the melted flat structure is only detectable under magnification in the cross-section of the sole, the finely dispersed material of the flat structure and the seam by which the upper material is joined to the flat structure during the manufacturing process are not depicted in FIG. 1.

Figure 2:
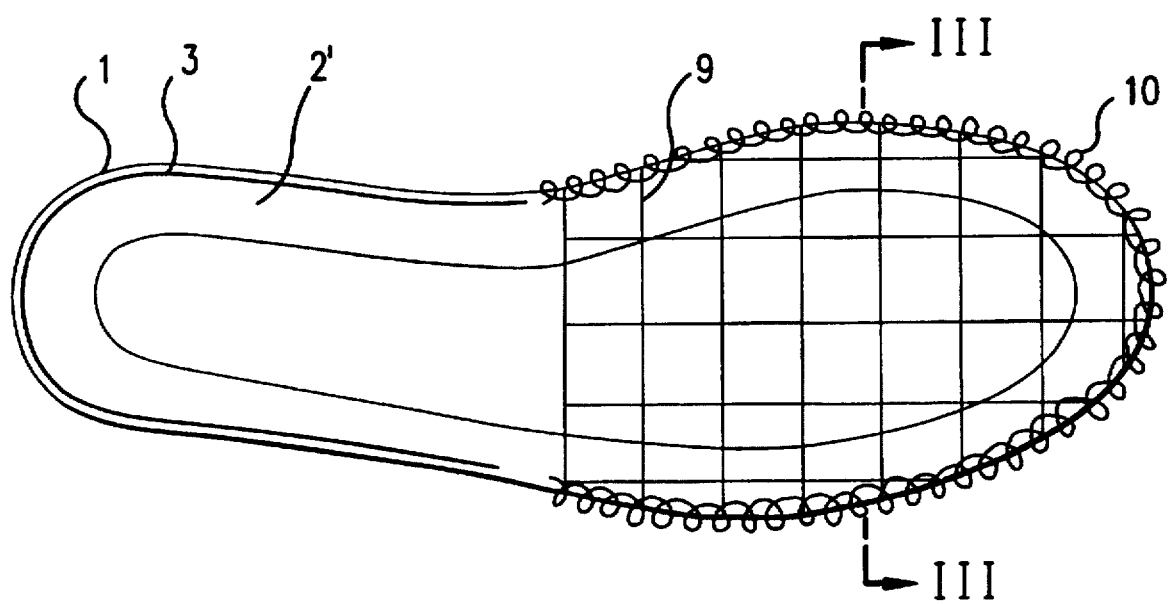
FIG. 2 shows a view from below of a shoe prepared according to a preferred embodiment of the method of the present invention.

In FIG. 2, a view from below a shoe prepared according to the method of the present invention is depicted. In this embodiment, the upper material 1 is reinforced in the heel area by a rear cap 3. The turned-back part of the lining 2' is again displayed. From the shank area of the shoe to the toe area, a flat structure 9 in the form of a grid is displayed. The grid is preferably made of polyethylene fibers having a melting temperature of about 135° C. The grid is preferably sewn with a sewing thread 10 to a lower edge of the upper material 1. Grid 9 is displayed in FIG. 2 as having relatively large opening; however, suitable grids generally have smaller openings than shown here. However, the size of the openings should preferably be selected at least large enough that the liquid sole material can flow through the grid openings without any great obstruction when the sole is spray-molded onto the grid.

Figure 3:
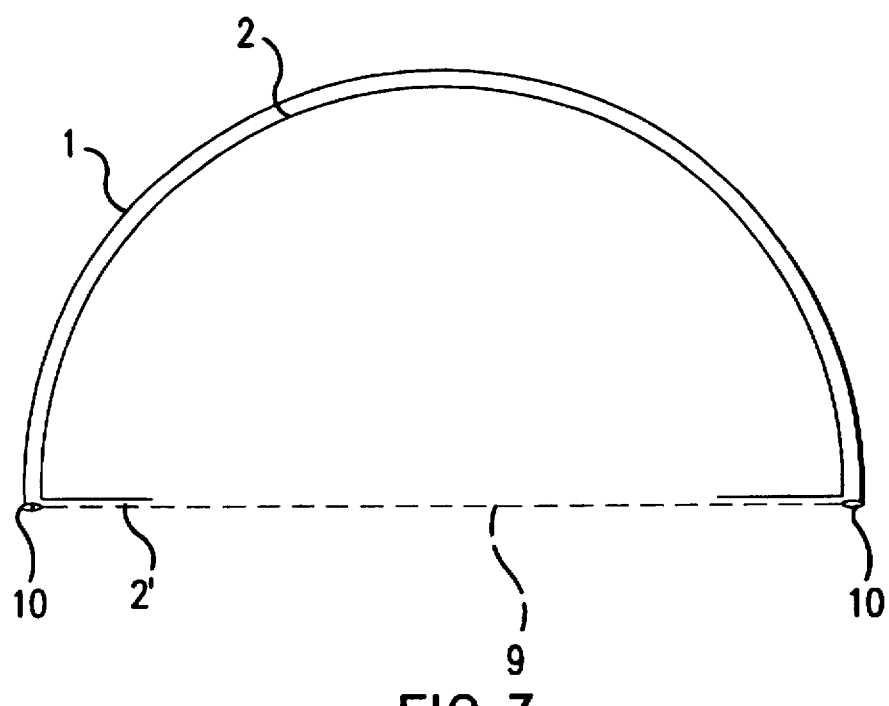
FIG. 3 shows a cross-sectional view along line B—B of the shoe of FIG. 2.

In FIG. 3, a cross-sectional view of the shoe in FIG. 2 is displayed at cross-section B—B. As depicted in FIG. 2, FIG. 3 displays an upper material 1, a lining 2, a turn-back part of the lining 2', a flat structure 9 and a sewing thread 10 joining the upper material and the flat structure.

In order to spray-mold the soles, a last coated with separation agent is placed in a shoe and the underside of the shoe is inserted into a spray-mold. When the sole material is sprayed into the mold, the sole material holds the lower edge of the upper material firmly along the edge and flows through grid 9 up to the last. In so doing, the sole material flows around grid 9 and causes the grid to melt. As the grid melts, the sole spray material cools and stiffens.

Figure 4:
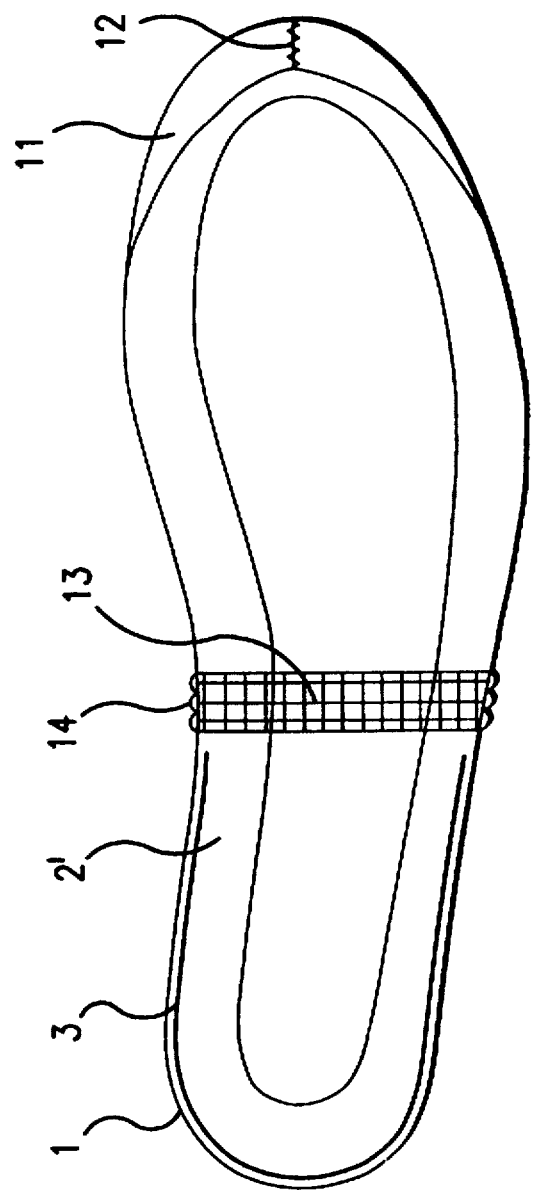
FIG. 4 shows a view from below of a shoe prepared according to a preferred embodiment of the method of the present invention wherein a narrow strip is selected for the flat structure.

In FIG. 4, a further view from below a shoe prepared according to the method of the present invention is shown. In this embodiment, a narrow strip 13 of grid is used as the flat structure. The narrow strip is sewn to the upper material along seam 14. Seam 14 is located on at least one side of the narrow strip in the shank area of the shoe. In this embodiment, the upper material is preferably cut in the toe area 11 and sewn together with seam 12. Shaping of the upper material is accomplished in the toe area by seam 12, in the shank area by strip 13 and in the heel area by rear cap 3. As in the embodiment above, when the sole material is sprayed into the mold, narrow strip 13 melts. Seam 14 and/or 12 may also melt during the spray-molding process.

As explained above, the method of the present invention produces virtually any type of shoe having a spray-molded sole. The method of the present invention is especially useful for producing shoes containing a lining which includes a waterproof, water vapor-permeable functional layer, such as the functional layer under the brand name SYMPATEX™. In all embodiments with functional layers, shoes manufactured according to the present invention are waterproof and exceptionally vapor-permeable such that foot moisture inside the shoes diffuses out of the shoes. The permeability of the shoes prevents fungal and bacterial infections, which often result due to moisture build-up within shoes.

The method of shoe manufacture and the shoe produced by the present invention provide the advantages described above over conventional methods of shoe manufacture and conventional shoes. In addition to the embodiments disclosed herein, other suitable embodiments will be apparent from the above disclosure.

What is claimed is:

1. A process of making a shoe wherein said process comprises the steps of:

bonding a flat structure to an upper layer of the shoe, the flat structure having a melting temperature $T_2$ and providing stability to a shape of the upper layer, to form a bonded structure;

positioning the bonded structure into a mold so that an underside of the bonded structure faces the mold;

spraying a liquid sole material into the mold, the sole material being at a temperature $T_1$ which is greater than temperature $T_2$, the sole material contacting and melting the flat structure;

allowing the sole material to cool and solidify; and removing the shoe from the mold, wherein the shoe does not have an insole.

2. A process according to claim 1, wherein the shape of the upper layer is further stabilized by at least one object which restricts movement of the upper layer during the spraying of the sole material.

3. A process according to claim 2, wherein said at least one object restricting movement of the upper material is selected from the group consisting of a last, a rear cap in a heel area of the shoe, a stitch in a toe area of the shoe, and a wall surface of the mold.

4. A process according to claim 1, wherein the mold is shaped such that the liquid sole material first contacts the upper layer along an outside periphery of the upper layer, the sole material providing stability to the shape of the upper layer.

5. A process according to claim 1, wherein the flat structure is porous, the flat structure being penetrated by the sole material.

6. A process accordingly to claim 1, wherein the flat structure comprises a grid having openings which are penetrated by the liquid sole material.

7. A process according to claim 1, wherein the flat structure comprises a thermoplastic material.

8. A process according to claim 6, wherein the flat structure comprises a net.

9. A process according to claim 1, wherein the flat structure comprises a textile material.

10. A process according to claim 1, wherein the flat structure and the upper layer are bonded by a sewing thread.

11. A process according to claim 10, wherein the sewing thread has a melting temperature $T_3$ which is lower than temperature $T_1$ of the liquid sole material.

12. A process according to claim 11, wherein the melting temperature $T_3$ of the sewing thread is at least 5° C. lower than temperature $T_1$.

13. A process according to claim 12, wherein the melting temperature $T_3$ of the sewing thread is about 10° to 25° C. lower than temperature $T_1$ of the sole material.

14. A process according to claim 1, wherein the melting temperature $T_2$ of the flat structure is at least 5° C. lower than temperature $T_1$ of the sole material.

15. A process according to claim 14, wherein the melting temperature $T_2$ of the flat structure is about 8° to 25° C. lower than temperature $T_1$ of the sole material.

16. A process according to claim 10, wherein the flat structure and the sewing thread comprise a material selected from the group consisting of polyethylene, polypropylene, polyester, and polyamide.

17. A process according to claim 1, wherein a lining containing a waterproof, water vapor-permeable functional layer is arranged on at least a portion of an inner surface of the upper layer, a portion of the lining extending inward from an outer periphery of the upper layer, the lining being arranged prior to bonding of the flat structure to the upper layer.

18. A process according to claim 17, wherein the flat structure is porous and is penetrated by the sole material, the sole material melts the flat structure and forms a continuous surface with the portion of the lining extending inward from the outer periphery of the upper layer.

19. A process according to claim 18, wherein the portion of the lining extending inward from the outer periphery of the upper layer is adhesively attached to the flat structure prior to spraying of the sole material.

* * * * *